US010979553B2

(12) United States Patent
Buescher, Jr. et al.

(10) Patent No.: US 10,979,553 B2
(45) Date of Patent: Apr. 13, 2021

(54) NEAR FIELD COMMUNICATIONS ACTIVATED DOOR ACCESS PANEL

(71) Applicant: Overhead Door Corporation, Lewisville, TX (US)

(72) Inventors: Brent Buescher, Jr., Wooster, OH (US); James Emery Midyette, III, Millersburg, OH (US)

(73) Assignee: OVERHEAD DOOR CORPORATION, Lewisville, TX (US)

( * ) Notice: Subject to any disclaimer, the term of this patent is extended or adjusted under 35 U.S.C. 154(b) by 0 days.

(21) Appl. No.: 15/151,718

(22) Filed: May 11, 2016

(65) Prior Publication Data

US 2016/0337502 A1 Nov. 17, 2016

Related U.S. Application Data

(60) Provisional application No. 62/162,474, filed on May 15, 2015.

(51) Int. Cl.
| | |
|---|---|
| *H04W 4/00* | (2018.01) |
| *H04W 52/02* | (2009.01) |
| *G05B 19/00* | (2006.01) |
| *G07C 9/00* | (2020.01) |
| *H04M 1/725* | (2021.01) |
| *H04W 12/08* | (2021.01) |
| *H04W 4/80* | (2018.01) |
| *H04B 5/00* | (2006.01) |

(52) U.S. Cl.
CPC ......... *H04M 1/72533* (2013.01); *H04W 4/80* (2018.02); *H04W 12/08* (2013.01); *H04W 52/027* (2013.01); *H04B 5/0031* (2013.01); *H04M 2250/04* (2013.01); *Y02D 30/70* (2020.08)

(58) Field of Classification Search
CPC . H04M 1/72533; H04M 1/725; H04W 4/008; H04W 12/06; H04W 52/027; H04W 52/02; H04B 5/0031; H04B 5/00; Y02B 60/50
See application file for complete search history.

(56) References Cited

U.S. PATENT DOCUMENTS 7,498,936 B2 * 3/2009 Maeng .................. G08B 21/24
340/10.3
8,175,591 B2 * 5/2012 Fitzgibbon ......... G07C 9/00182
340/5.7

(Continued)

OTHER PUBLICATIONS

Miller, Ben, How to Open Your Garage Door With RFID, Sep. 27, 2013, 14 pgs., website at https://computers.tutsplus.com/articles/how-to-open-your-garage-door-with-rfid—mac-54164, captured Nov. 22, 2016.

*Primary Examiner* — Pablo N Tran
(74) *Attorney, Agent, or Firm* — Haynes and Boone, LLP

(57) ABSTRACT

Disclosed herein is an access control apparatus for a barrier movement system that moves a barrier. The access control apparatus includes a near field communications (NFC) module, a radiofrequency (RF) module, and a controller coupled to the NFC module and RF module. The controller is configured to read an NFC signal from an authenticated external device, via the NFC module. In response to reading the NFC signal, the controller transmits a command signal, via the RF module, that commands the barrier movement system to move the barrier.

21 Claims, 3 Drawing Sheets

(56) References Cited

U.S. PATENT DOCUMENTS

| | | | |
|---|---|---|---|
| 8,836,469 B2* | 9/2014 | Fitzgibbon | H04B 1/713 340/5.1 |
| 9,054,961 B1* | 6/2015 | Kim | H04L 41/0806 |
| 9,373,208 B2* | 6/2016 | Candelore | G07C 9/00182 |
| 9,407,624 B1* | 8/2016 | Myers | H04L 63/08 |
| 9,449,449 B2* | 9/2016 | Evans | |
| 9,698,997 B2* | 7/2017 | Arteaga-King | H04L 12/2809 |
| 2007/0060056 A1* | 3/2007 | Whitaker | H04M 1/72533 455/41.2 |
| 2013/0147600 A1* | 6/2013 | Murray | G07C 9/00571 340/5.71 |
| 2013/0173925 A1* | 7/2013 | Yen | G06F 21/32 713/186 |
| 2014/0184393 A1* | 7/2014 | Witkowski | G07C 5/008 340/12.5 |
| 2015/0221147 A1* | 8/2015 | Daniel-Wayman | G07C 9/00103 340/5.54 |
| 2015/0235493 A1* | 8/2015 | Hall | G07C 9/00896 340/5.71 |

* cited by examiner

NEAR FIELD COMMUNICATIONS ACTIVATED DOOR ACCESS PANEL

PRIORITY CLAIM

This application claims the priority benefit of Provisional Patent Application No. 62/162,474 filed on May 15, 2016, the content of which is hereby incorporated by reference in its entirety to the maximum extent allowable by law.

TECHNICAL FIELD

The present invention relates generally to remote operated barrier operator systems, and more particularly to the use of near field communications (NFC) in connection therewith.

BACKGROUND

Movable barriers, such as upward acting sectional or single panel garage doors, residential and commercial rollup doors, and slidable and swingable gates, are used to alternatively allow and restrict entry to building structures and property. These barriers are driven between their respective open and closed positions by coupled barrier moving units, known and referred to in the trade as "barrier operators", and in the specific case of a garage door, known and referred to as "garage door operators."

For example, a typical garage door operator for driving an upward acting sectional garage door between its open and closed positions includes, as a central control unit, a door control module or "head" unit including a microcontroller for (i) processing incoming user actuated door instructions and (ii) generating output control signals corresponding to these instructions; a motor controller for receiving and transmitting these control signals to a motor; and a DC or AC motor drivingly coupled to the garage door. The user actuated door instructions are in the form of wired or wireless signals typically transmitted to the microcontroller from wall consoles mounted at the interior and exterior of the garage, hereinafter referred to as "access panels", or from hand held or vehicle mounted RF transmitters.

Activation of a barrier operator so as to cause a barrier to be driven between the open and closed positions via an exterior access panel can be particularly convenient for users. For example, the barrier may be opened without the need for the user to carry an RF transmitter. These exterior access panels typically utilize a keypad into which a user must enter a personal identification code in order for the barrier operator to be enabled to cause the barrier to be driven between the open and closed positions.

While such exterior access panels are in wide use and add convenience for users, additional functionality is still desirable. For example, a user may have forgotten their personal identification code and not have their RF transmitter in their immediate possession. Consequently, further developments in exterior access panels for activating a barrier operator, such as a garage door opener, to accommodate those and other situations are desirable. For example, other ways of causing exterior access panels to enable the barrier operator are desirable.

As known to those of skill in the art, near field communications (NFC) is a form of short-range wireless communication in which an NFC antenna is used. An NFC antenna is much smaller than the wavelength of the carrier signal, thus preventing a standing wave from developing within the antenna. In the near-field, typically considered to be one quarter of a wavelength or less, the antenna can produce either an electric field, or a magnetic field, but not an electromagnetic field. Thus, near field communications are either by way of a modulated electric field, or a modulated magnetic field, but not by a modulated electromagnetic wave.

The NFC technology has recently expanded to smartphones, smartphones typically using electric field NFC, operating at a frequency of 13.56 MHz, corresponding to a wavelength of 22.11 m, for secure communications. Therefore, NFC technology is particularly useful for smartphone communication because the very short range of NFC makes it difficult for eavesdroping. In operation, the NFC antenna sets up the near-field around itself, with length, width and depth of the field being roughly the same as the dimensions of the NFC antenna. Thus, the NFC antenna produces a stationary electric field pulsating at 13.56 MHz. If another similarly small NFC antenna comes into this electric field, it will induce an electric potential into it, alternating at the same frequency. By modulating the signal in the NFC antenna, a signal is thus transmitted to the passive, receiving NFC antenna.

It is therefore the principal object of this invention to utilize the benefits of near field communication technology to improve the ability to obtain remote access to a garage or other building structure.

SUMMARY

Disclosed herein is an access control apparatus for a barrier movement system that moves a barrier. The access control apparatus includes a near field communications (NFC) module, a radiofrequency (RF) module, and a controller coupled to the NFC module and RF module. The controller is configured to read an NFC signal from an authenticated external device, via the NFC module. In response to reading the NFC signal, the controller transmits a command signal, via the RF module, that commands the barrier movement system to move the barrier.

Another aspect is directed to electronic device for communication with an access control apparatus for a barrier movement system that moves a barrier. The access control apparatus includes a near field communications (NFC) module, a radiofrequency (RF) module, and a controller coupled to the NFC module and RF module. The controller is configured to read an NFC signal, via the NFC module, and in response to reading the NFC signal and receiving a user command, transmit a command signal, via the RF module, that commands the barrier movement system to move the barrier. The electronic device includes a near field communications (NFC) module, a wireless data module, and a controller coupled to the NFC module and the wireless data module. The controller is configured to activate the NFC module to transmit the NFC signal to the access control apparatus, and send the user command to the access control apparatus, using the wireless data module.

A method aspect is directed to a method of moving a barrier that includes bringing an authenticated near field communications (NFC) device within communications distance of an access control apparatus that reads a NFC signal emitted from the authenticated NFC device, and in response to the NFC signal, transmits a command signal that commands a barrier movement system to move the barrier.

Another method aspect is directed to a method of operating an access control apparatus for a barrier movement system that moves a barrier including reading a near field communications (NFC) signal from an authenticated external device, using a NFC module. A command signal that commands the barrier movement system to move the barrier is transmitted, using a radiofrequency (RF) module.

DETAILED DESCRIPTION

One or more embodiments of communication systems in accordance with the principles of the present invention will be described below. These described embodiments are only examples of techniques to implement the invention, as defined solely by the attached claims. Additionally, in an effort to provide a focused description of the invention and the principles of the invention, minor features of an actual implementation may not be described in the specification.

Figure 1:
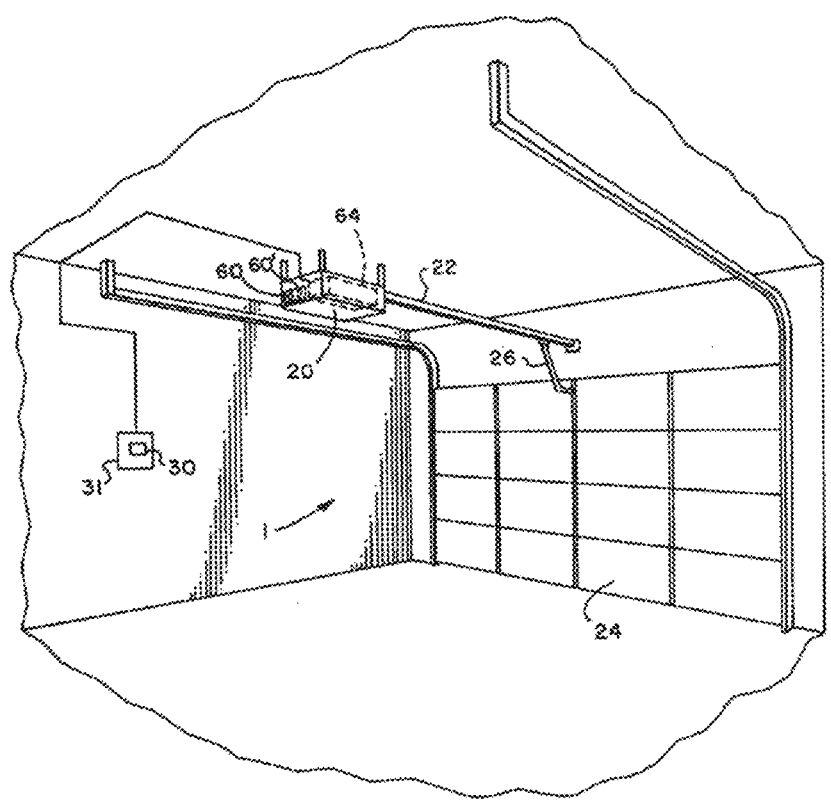
FIG. 1 shows an interior perspective of a residential garage diagrammatically illustrating a typical system for opening and closing the garage door.

FIG. 1 shows an embodiment of a typical garage door operator, or remote controlled garage door opener system 1 used for proximately (or remotely) activating (opening and closing) a garage door. The system 1 includes a garage door operator, the principal component in this embodiment of which is a door control module or head unit 20 normally suspended from the ceiling of the garage. A rail 22 extends from head unit 20 and is secured to the wall above the garage door 24. One end of a door arm 26 is joined to the garage door 24, and an opposed end of the door arm 26 is adapted to reciprocate along the length of the rail 22. The head unit 20 includes a drive mechanism 64, as is known in the art, for reciprocatively moving a carriage (not shown) by chain, belt, or screw drive along the rail 22, thus respectively opening and closing the garage door 24. The control module or head unit 20 also includes a controller 131 (see FIG. 3), constituting a microcontroller, microprocessor, system on a chip, programmable gate array or similar apparatus that, upon receipt of user-actuated instruction signals, processes and outputs these instructions to the drive mechanism 64, thereby effectuating opening or closing of the garage door 24. Additional details of this type of garage door opener system are disclosed, for example, in U.S. Pat. No. 8,842,829, issued Sep. 23, 2014, assigned to the assignee of the present invention, and incorporated herein by reference for all purposes. Alternatively, the garage door opener system 1 may be of the jackshaft/counterbalance drive type known in the industry, an example of which is disclosed in U.S. Pat. No. 7,296,607, issued Nov. 20, 2007, assigned to the assignee of the present invention, and incorporated herein by reference for all purposes.

Figure 2:
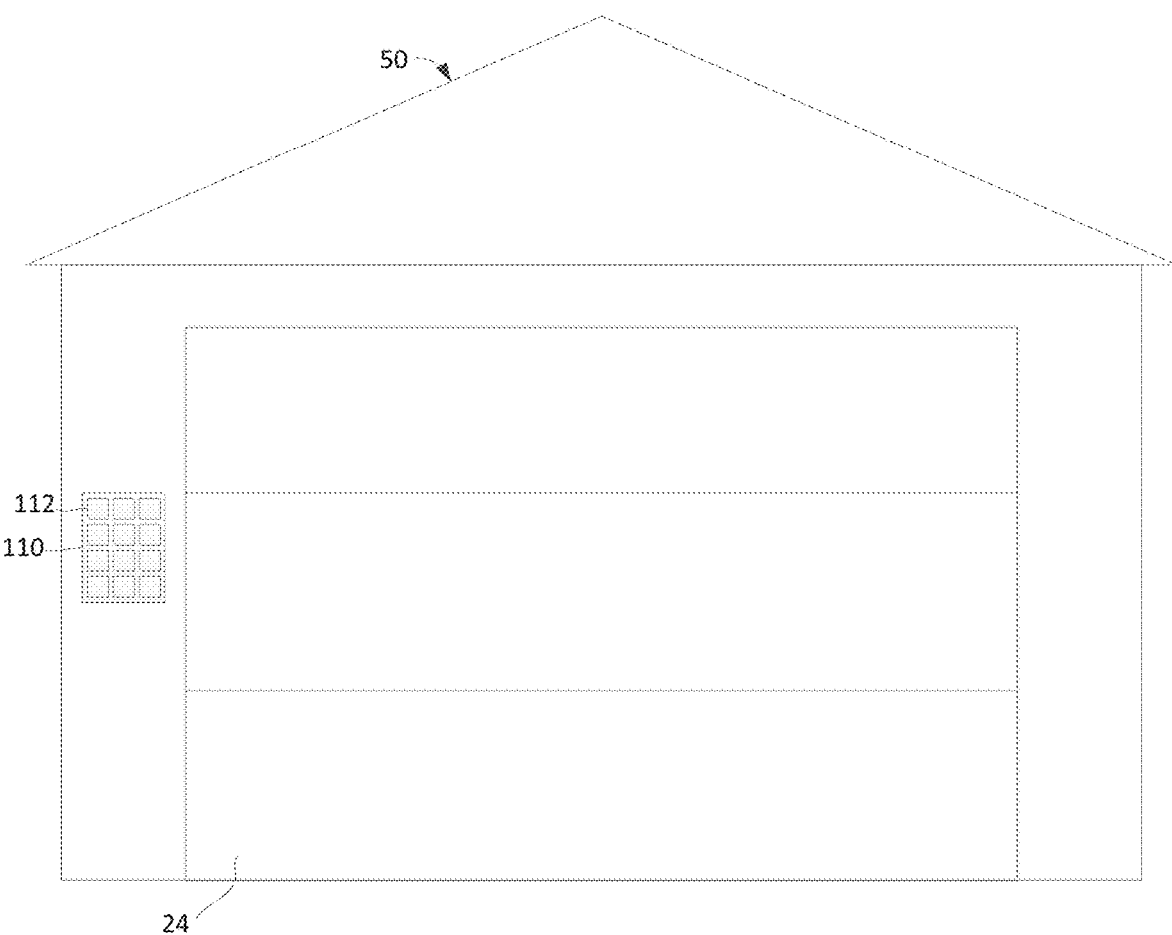
FIG. 2 shows an exterior front plan view of the residential garage of FIG. 1, showing an exterior access panel.

Referring again to the embodiment of FIG. 1, the user actuated instruction signals may originate from an interior located access panel 31, in wired connection with the controller of the head unit 20, by which user actuation of the button switch 30 of the access panel 31 instructs the opening or closing of the garage door 24. Alternatively, encoded radio frequency (RF) instructions may be transmitted to an antenna included within a RF module 133 in the head unit 20 (see FIG. 3), which is constituted by a RF receiver or RF transceiver, and in turn may be passed to the controller in the head unit 20. The RF instructions may originate from a hand-held or vehicle mounted transmitter, or from an exterior mounted access panel 110 (see FIG. 2).

Figure 3:
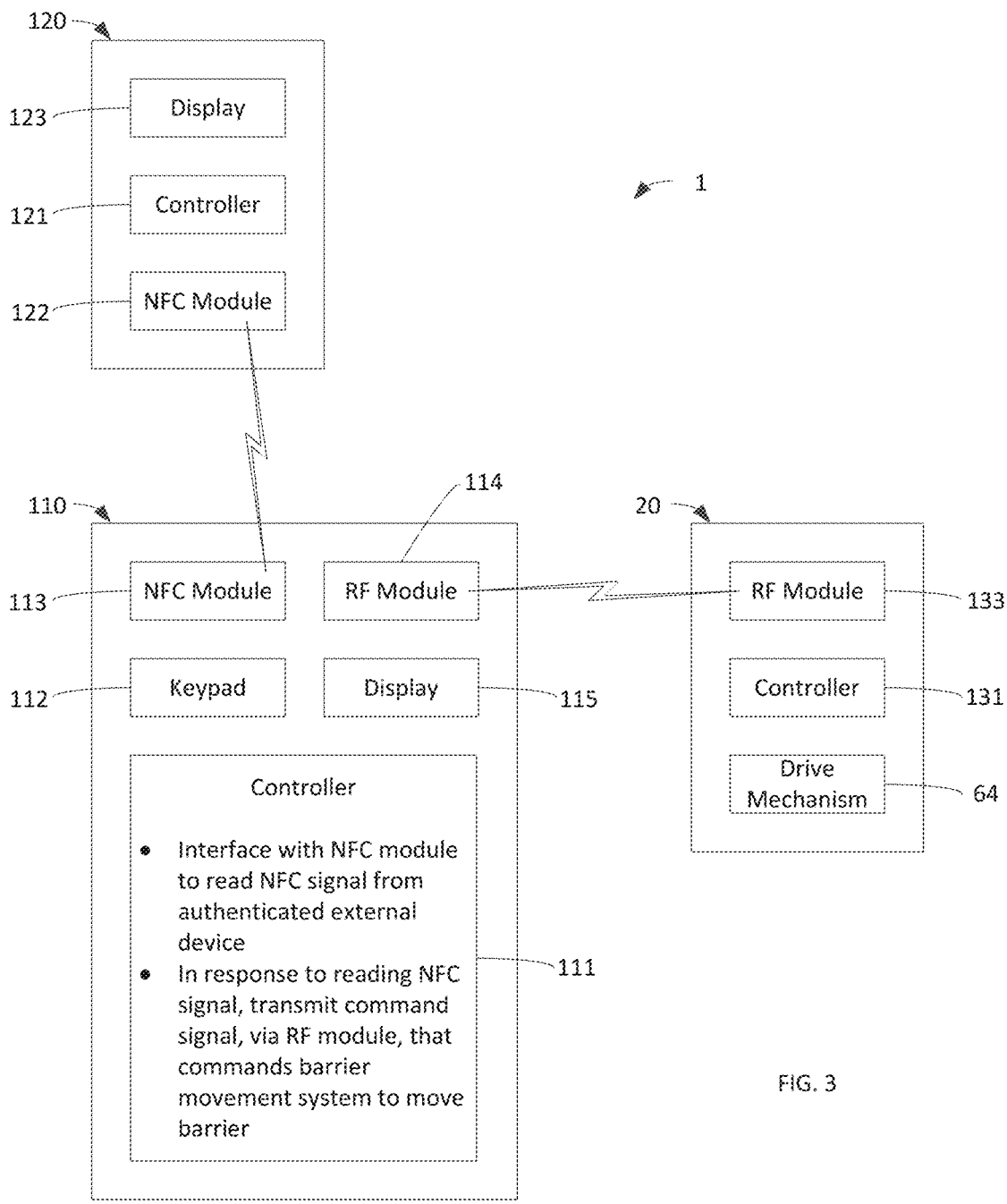
FIG. 3 is a schematic block diagram of the principal component parts of a system for opening the garage door in accordance with the present invention.

Referring again to FIG. 3, the exterior mounted access panel 110 includes a keypad 112, which includes a plurality of electrical switches, for accepting user entry of an access code. As illustrated in FIG. 3, the access panel 110 may optionally include a display 115, such as a LCD or seven segment panel, for displaying to the user the keys of the access code as entered, or a visual representation of how many keys have been pressed. A controller 111, such as a microcontroller, microprocessor, programmable gate array, or similar apparatus, is coupled to the keypad 112, and reads output from the electrical switches of the keypad 112. When an access code is entered into the keypad 112, the controller 111 compares the access code to one or more stored authorized access codes. If the entered access code matches a stored authorized access code, the controller 111 may cause the display 115 to display a message to the user indicating that the access code is authorized and has been accepted. When the entered access code matches a stored authorized access code, the controller 111 encodes user-actuated instructions to open or close the door, and actuates an RF module 114, which is a RF transmitter or RF receiver coupled to an antenna. The RF module 114 uses the antenna to transmit the encoded user-activated instructions as encoded user-actuated RF instructions to the RF module 133 in the head unit 20.

The encoded user-actuated RF instructions utilize an encrypted hopping code signal that changes with each transmission. The controller 111 of the access panel 110 therefore performs encryption, while the controller 131 of the head unit 20 is operable to decrypt the encrypted hopping code signal as received by its RF module 133 and to activate drive mechanism 64 when the decrypted signal properly identifies the transmission as having come from the access panel 110. The encoding and decoding functions respectively performed by the controller 111 of the access panel 110 and controller 131 of the head unit 20 employ variations of the code hopping technique disclosed in U.S. Pat. No. 5,517,187 to Bruwer, et al., which by this reference is incorporated herein in its entirety. These variations of the code hopping technique are disclosed in U.S. Pat. No. 6,667,684 to Wagamon et al., and in U.S. Pat. No. 8,842,829 to Bresson et al., both of which are hereby incorporated by reference to the maximum extent allowable under the law.

The access panel 110 includes a NFC module 133, which is comprised of a NFC antenna and a NFC receiver or NFC transceiver. The NFC module 133 enables the access panel 110 to communicate with a smartphone 120. The smartphone 120 includes a controller 121, which may be a system on a chip, microcontroller, microprocessor, or other suitable apparatus, coupled to a NFC module 122, and to a touch sensitive display 123 that also acts as an input device. The NFC module 122 includes a NFC antenna coupled to a NFC transceiver, while the touch sensitive display 123 includes a display layer, and a capacitive sensing layer associated with the display layer.

The invention described herein specifically relies on the use of the NFC module 133 for actuation of the access panel 110 and subsequent causing of the access panel 110 to transmit the encoded instructions to the head unit 20. Accordingly, details of improvements to the system 1, in accordance with the principles of the present invention, are now described.

The smartphone 120 and the access panel 110 are initially "paired" through a NFC communication between their respective NFC modules 113, 122 and the entering of an authorized personal identification number into the keypad 112 of the access panel 110, and potentially into the touch sensitive display 123 of the smartphone 120. Once the smartphone 120 and access panel 110 are paired, the smartphone 120 is then considered to be authorized.

A subsequent NFC communication between the respective NFC modules 113, 122 causes the controller 111 to transmit the encoded user-actuated RF instructions using the RF module 114, so as to command the head unit 20 to open or close the garage door 24. If the controller 111 of the access panel 110 does not recognize the smartphone 120 as being authorized, it will not open or close the garage door 24 based upon NFC communication, thereby disallowing unauthorized access to the interior of the structure bounded by the garage door 24.

In some applications, the controller 111 of the access panel 110 is configured to only cause the RF module 114 to transmit the encoded user-actuated RF instructions during a certain interval of time. That is, if a NFC communication is initiated between the NFC modules 113, 122 during the interval of time (i.e. between 9 am and 5 pm), the controller 111 of the access panel 110 will cause the RF module to transmit the encoded user-actuated RF instructions, but if the NFC communication is initiated outside of that interval of time, the controller 111 of the access panel 110 will take no action. The interval of time may be programmed into the controller 111 of the access panel 110 via the keypad 112.

The controller 111 of the access panel 110 may additionally or alternatively be configured to only cause the RF module 114 to transmit the encoded user-actuated RF instructions on a certain day or days of the week, or on a certain date or dates. For example, if a NFC communication is initiated between the NFC modules 113, 122 on a Monday, the controller 111 of the access panel 110 will cause the RF module to transmit the encoded user-actuated RF instructions, but if the NFC communication is initiated on Tuesday, the controller 111 of the access panel 110 will take no action. As another example, if a NFC communication is initiated between the NFC modules 113, 122 on Jan. 2, 2015, the controller 111 of the access panel 110 will cause the RF module to transmit the encoded user-actuated RF instructions, but if the NFC communication is initiated on Jan. 1, 2015, the controller 111 of the access panel 110 will take no action. The day or days of the week, or date or dates, may be programmed into the controller 111 via the keypad 112.

Those skilled in the art will appreciate that the time intervals and day of week or date restrictions may be utilized in tandem. Thus, the controller 111 may be configured to only cause the RF module to transmit the encoded user-actuated RF instructions if the NFC communication is initiated between 9 am and 5 pm on a weekday, for example.

Those skilled in the art will also appreciate that different smartphones 120 may be paired to the access panel 110, and that such different smartphones may have different access limitations. For example, the controller 111 may be configured to cause the RF module to transmit the encoded user-actuated RF instructions if the NFC communication is initiated at any time by a first smartphone 120, but to only cause the RF module to transmit the encoded user-actuated RF instructions if the NFC communication is initiated during a certain interval of time, or on a certain day or days, or on a certain date or dates, if the NFC communications is initiated by a second smartphone.

Although the foregoing description has described the system 1 with reference to a smartphone 120 being used to actuate the access panel 110, it should be understood that any device with a NFC module may be authenticated, and used with the system once authenticated. For example, an unpowered NFC token or NFC sticker may be used.

In some cases, the system 1 may operate on a dual authentication basis. In detail, after the NFC communication between the respective NFC modules 113, 122 takes place, a second user input must be provided in order for the controller 111 to transmit the encoded RF instructions to command the head unit 20 to open or close the garage door 24 using the RF module 114. The second user input may be provided by entering an authorized access code into the keypad 112, after which the controller 111 transmits the encoded RF instructions. As another example, the second user input may be provided by entering an access code into the smartphone 120 via its touch sensitive display 123, or by providing biometric information (such as a fingerprint or retina) to the smartphone 120. In this instance, the smartphone 120 may, without user input, prompt the user for either an access code or biometric information, in response to initiation of the NFC communication between the NFC modules 113, 122.

In some cases, the access panel 110 may be powered by a battery, and may remain in a low power state until initiation of the NFC communication between the respective NFC modules 113, 122, at which point the access panel 110 transitions into a normal operating mode until at least completion of transmission of the encoded RF instructions by the controller 111.

In the low power state, the various components of the access panel 110 may be either off or in a low power mode. For example, in the low power state, the clock speed of the controller 111 may be reduced, the display 115 may be off, the RF module 114 may be off, a backlight of the display 115 or keypad 112 (if so equipped) may be off, and an indicator light (if so equipped) indicating whether the access panel 110 is operating in the normal operating state may be off.

After transition into the normal operating state, the various components of the access panel 110 that were either off or in a low power mode are placed into a normal operation state. Thus, for example, the clock speed of the controller 111 may be increased, the display 115 may be on, the RF module 114 may be on, a backlight of the display 115 or keypad 112 (if so equipped) may be on, and an indicator (if so equipped) indicating whether the access panel 110 is operating in the normal operating state may be on.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An access control apparatus for a barrier movement system that moves a barrier comprising:
    a near field communications (NFC) module;
    a radiofrequency (RF) module;
    a controller coupled to the NFC module and RF module, the controller configured to:
        pair the NFC module with an external NFC module of an external device to authenticate the external device;
        initiate NFC communication between the NFC module and the external NFC module, wherein the initiation of the NFC communication causes the external device, without user input, to prompt a user for authentication information;

read an NFC signal from the authenticated external device, via the NFC communication;

in response to reading the NFC signal, transmit a command signal, via the RF module, that commands the barrier movement system to move the barrier; and further comprising a battery powering the RF module and controller; and wherein the controller is configured to operate in a low power mode until the NFC communication is initiated, and thereafter operate in a normal operation mode until completion of the transmission of the command signal.

2. The access control apparatus of claim 1, wherein the authenticated external device comprises a smartphone.

3. The access control apparatus of claim 1, wherein the authenticated external device comprises a NFC token.

4. The access control apparatus of claim 1, wherein the controller is configured to transmit the command signal in response to reading the NFC signal and based upon a current time of day being within a given interval of time.

5. The access control apparatus of claim 4, further comprising an input device coupled to the controller; and wherein the controller permits selection of the given interval of time, via the input device.

6. The access control apparatus of claim 1, wherein the controller is configured to transmit the command signal in response to reading the NFC signal and based upon a current date being inside a given interval of dates.

7. The access control apparatus of claim 6, further comprising an input device coupled to the controller; and wherein the controller permits selection of the given interval of time, via the input device.

8. The access control apparatus of claim 1, wherein the controller is configured to transmit the command signal in response to reading the NFC signal and based upon a current day of the week being inside a given interval of days of the week.

9. The access control apparatus of claim 8, further comprising an input device coupled to the controller; and wherein the controller permits selection of the given interval of time, via the input device.

10. The access control apparatus of claim 1, further comprising an input device coupled to the controller; and wherein the controller is also configured to accept a user command via the input device, and in response to the user command, transmit a command signal via the RF module that commands the barrier movement system to move the barrier.

11. The access control apparatus of claim 1, wherein the controller, when operating in the low power mode, deactivates the RF module.

12. The access control apparatus of claim 1, wherein the controller, when operating in the normal operation mode, activates the RF module.

13. The access control apparatus of claim 1, further comprising at least one indication light source; wherein the controller, when operating in the lower power mode, deactivates the at least one indication light source; and wherein the controller, when operating in the normal operation mode, activates the at least one indication light source.

14. The access control apparatus of claim 13, further comprising an input device coupled to the controller, and a backlight for the input device; and wherein the at least one indication light source is the backlight for the input device.

15. The access control apparatus of claim 1, further comprising an input device coupled to the controller; and wherein the controller is also configured to accept an access code via the input device, and in response to the access code and reading of the NFC signal from the authenticated external device, transmit the command signal via the RF module.

16. The access control apparatus of claim 1, wherein the controller is also configured to accept a user command wirelessly transmitted from the authenticated external device not using a NFC signal, and in response to the user command transmit the command signal via the RF module.

17. A method of operating an access control apparatus for a barrier movement system that moves a barrier comprising:

initiating NFC communication between an external NFC module of an external device and an NFC module of the access control apparatus;

prompting a user, without user input, for authentication information via the external device;

receiving the authentication information via the external device;

reading a near field communications (NFC) signal via the NFC communication;

transitioning the access control apparatus from a low power state to a normal operating mode in response to the initiating; and transmitting a command signal that commands the barrier movement system to move the barrier, using a radiofrequency (RF) module.

18. An access control apparatus for a barrier movement system that moves a barrier, comprising:

a near field communications (NFC) module;

a radiofrequency (RF) module;

a controller coupled to the NFC module and RF module, the controller configured to:

read an NFC signal from a smartphone, via the NFC module;

receive, after reading the NFC signal, authentication information provided by a user to the smartphone, wherein the smartphone is configured to prompt the user for the authentication information without receiving user input; and transmit, in response to reading the NFC signal and receiving the authentication information, without user manipulation of the access control apparatus, a command signal via the RF module that commands the barrier movement system to move the barrier.

19. The access control apparatus of claim 18, wherein the authentication information comprises biometric information.

20. The access control apparatus of claim 18, wherein the authentication information comprises an access code.

21. The access control apparatus of claim 18, wherein the smartphone prompts the user to input the authentication information in response to initiation of the NFC signal.

* * * * *